AUGUSTE FAU AND EUGÈNE FAU, OF CASTRES, FRANCE.

Letters Patent No. 92,179, dated July 6, 1869.

IMPROVED MODE OF CLEANING SHEEP AND OTHER SKINS FOR TANNING.

The Schedule referred to in these Letters Patent and making part of the same.

*To all whom it may concern:*

Be it known that we, AUGUSTE FAU and EUGÈNE FAU, both of Castres, in the department of the Tarn, in the Empire of France, have invented an "Improved Process for Washing, Freeing from Burrs, and Unhairing Skins;" and we do hereby declare that the following is a full and exact description thereof.

In order to clean the skins of sheep and other wool-coated animals, clogged with thistles, clot-burrs, or goose-grass, they are usually soaked in water during several hours, then placed, one by one, on an inclined plane, and there receive blunt strokes, struck with a round iron rod, so as to detach these thistles, clot-burrs, goose-grass, or catch-weed, as much as possible. The skins are then washed in a running stream. After they have been washed, and submitted to a heating or fermentation, the unhairing is effected either by hand, or with an iron tool known as a shaving-knife.

In lieu of this method of freeing from burrs, which is dirty and fatiguing to the workman, and burdensome, tiresome, and disagreeable to the employer, as well as of the above method of unhairing, which is costly and injurious to the skin, we use, with considerable advantage, the following process of washing, freeing from burrs, and unhairing.

We submit woolly skins clogged with thistles, clot-burrs, or goose-grass, to a preliminary soaking in wate We then place one or several on a cylindrical drum, preferably of a conical shape, and movable or rotary, or upon inclined planes, or any kind of surfaces, movable or fixed, and we direct on to these skins one or several jets of water, under pressure obtained by means of a natural or an artificial fall, or of pumps worked by any available motive-power.

The result of this operation is a thorough washing, and complete extraction of all the filth, and of the foreign matters from the wool, such as thistles, clot-burrs, burdocks, goose-grass, or catch-weed.

We remove the wool from the skins by the same means of jets of water under pressure, either pure water, soapy water, alkaline or other water, either hot or cold, without having recourse to the old processes of unhairing.

What we claim as our invention, and desire to secure by Letters Patent, is—

The use of jets of water, under pressure, as we have above described, for washing, freeing from burrs, and unhairing woolly skins.

AUGUSTE FAU.
EUGÈNE FAU.

Witnesses to signatures of A. FAU and E. FAU:
  ROSSIGNOL,
    *Notaire à Castres,*
      *Rue des Trois Rois, No.* 11.
  JOËL COULON,
    *Neg'nt, Rue de l'Hôtel de Ville,*
      *No.* 9, *à Castres.*